United States Patent
McAlpine

(10) Patent No.: US 10,451,203 B2
(45) Date of Patent: Oct. 22, 2019

(54) PUSH FIT CONNECTOR

(71) Applicant: McAlpine & Co. Ltd., Glasgow, Strathclyde (GB)

(72) Inventor: James Edward McAlpine, Paisley (GB)

(73) Assignee: McAlpine & Co. Ltd., Glasgow (GB)

( * ) Notice: Subject to any disclaimer, the term of this patent is extended or adjusted under 35 U.S.C. 154(b) by 9 days.

(21) Appl. No.: 15/550,642

(22) PCT Filed: Feb. 16, 2016

(86) PCT No.: PCT/GB2016/050372
§ 371 (c)(1),
(2) Date: Aug. 11, 2017

(87) PCT Pub. No.: WO2016/132110
PCT Pub. Date: Aug. 25, 2016

(65) Prior Publication Data
US 2018/0031155 A1 Feb. 1, 2018

(30) Foreign Application Priority Data
Feb. 16, 2015 (GB) .................................. 1502584.4

(51) Int. Cl.
*F16L 19/08* (2006.01)
*F16L 19/06* (2006.01)
(Continued)

(52) U.S. Cl.
CPC .......... *F16L 19/062* (2013.01); *F16L 19/065* (2013.01); *F16L 19/07* (2013.01); *F16L 19/075* (2013.01); *F16L 25/12* (2013.01); *F16L 25/14* (2013.01)

(58) Field of Classification Search
CPC ....... F16L 19/062; F16L 19/065; F16L 19/07; F16L 19/075; F16L 19/08; F16L 25/12; F16L 25/14
See application file for complete search history.

(56) References Cited

U.S. PATENT DOCUMENTS

| 2,358,408 A | 9/1944 | McMurray |
| 2,561,887 A * | 7/1951 | Risley ..................... F16L 19/06 285/341 |

(Continued)

FOREIGN PATENT DOCUMENTS

| DE | 861769 C | 1/1953 |
| DE | 202014104036 U1 | 11/2014 |

OTHER PUBLICATIONS

International Search Report and Written Opinion, Application No. PCT/GB2016/050372, dated May 31, 2016, 12 pages.
(Continued)

*Primary Examiner* — Gilbert Y Lee
(74) *Attorney, Agent, or Firm* — Colby Nipper PLLC

(57) ABSTRACT

A connector (10) or kit of parts facilitates sealingly inserting a plumbing member (211) into a gap (250) created in an existing pipeline (200). The connector (10) comprises a bridging sleeve (12; 212), a first sealing device (14; 214), a second sealing device (16; 216), a first sealing element (18; 218), and a second sealing element (20; 220). In use, the first sealing device (14; 214) is adapted to form a first seal between a bridging sleeve (12; 212) first tubular section internal surface and an existing pipeline external surface (252, 254) by compression of the first sealing element (18; 218) and the second sealing device (16; 216) is adapted to form a second seal between a plumbing member internal surface and a bridging sleeve second tubular section external surface (24) by compression of the second sealing element (20; 220).

22 Claims, 2 Drawing Sheets

(51) Int. Cl.
  *F16L 19/065* (2006.01)
  *F16L 19/07* (2006.01)
  *F16L 19/075* (2006.01)
  *F16L 25/12* (2006.01)
  *F16L 25/14* (2006.01)

(56) References Cited

U.S. PATENT DOCUMENTS

| | | | | |
|---|---|---|---|---|
| 2,570,224 | A * | 10/1951 | Fason | F16L 19/08 285/305 |
| 3,265,412 | A * | 8/1966 | Reid | F16L 19/08 285/323 |
| 3,653,688 | A * | 4/1972 | Sakakibara | F16L 17/025 285/105 |
| 3,915,480 | A * | 10/1975 | Kish | F16L 17/10 277/615 |
| 5,056,755 | A | 10/1991 | Jang et al. | |
| 5,730,476 | A * | 3/1998 | Gouda | F16L 19/08 285/340 |
| 9,671,049 | B1 * | 6/2017 | Crompton | F16L 19/065 |
| 2002/0017789 | A1 | 2/2002 | Holmes, IV et al. | |
| 2002/0116759 | A1 | 8/2002 | Mantyla et al. | |
| 2009/0236847 | A1 | 9/2009 | Hall | |

OTHER PUBLICATIONS

Notification of Grant, Application No. GB 1502584.4, dated Jun. 13, 2017, 2 pages.
Certificate of Grant of Patent, Patent No. GB 2540113, dated Jul. 12, 2017, 2 pages.
Grant Document, Patent No. GB 2540113, dated Jul. 12, 2017, 19 pages.
JKIPO Combined Search and Exam Report, Application No. GB 1502584.4, dated Nov. 4, 2016.

\* cited by examiner

PUSH FIT CONNECTOR

FIELD OF THE INVENTION

The present invention relates to the field of drain plumbing. In particular it encompasses an apparatus for easily and effectively inserting a drain fitting in-line in an existing drain line.

BACKGROUND TO THE INVENTION

There are numerous situations when it is desirable to insert a plumbing fitting to an existing drain line, for example, a T insert to accommodate an additional drain point from a sanitary appliance or to add a rodent trap insert into an existing drain line, to name a few.

To this end, the currently used approach is to cut and remove a portion of drain pipe of slightly larger length than the plumbing fitting to be inserted, to cut to portions of flexible or elastic material, such as sleeves, to place the fitting in place and to seal the fitting onto the cut pipe ends and the fitting with the flexible or elastic material and at least two jubilee clips at each side of a cut in the pipe (FIG. 1).

This method is time consuming and does not always result in a tight seal and/or neat finish.

SUMMARY OF THE INVENTION

According to a first aspect of the present invention there is provided a connector for sealingly inserting a plumbing member into a gap created in an existing pipeline, the connector comprising:
 a bridging sleeve,
 a first sealing device
 a second sealing device
 a first sealing element and
 a second sealing element
 wherein, in use, the first sealing device is adapted to form a first seal between a bridging sleeve first tubular section internal surface and an existing pipeline external surface by compression of the first sealing element and the second sealing device is adapted to form a second seal between a plumbing member internal surface and a bridging sleeve second tubular section external surface by compression of the second sealing element.

In at least one embodiment of the present invention a connector as described above provides a way of sealingly inserting a plumbing member into a gap created in an existing or installed pipeline such that one end of the bridging sleeve is supported by the existing pipe and the other end of the bridging sleeve supports the plumbing member. This provides for a stronger and more stable union than those achieved with flexible or elastic materials and jubilee clips, as currently used in the prior art. It is understood that the bridging sleeve is rigid and this has not been expressly described for the sake of clarity. However, in some embodiments, the bridging sleeve will exhibit a slight degree of flexibility or yield notwithstanding the fact that it can still be described as a rigid sleeve.

It is also an advantage of the previously described connector that it allows for cooperation among the existing pipeline, the bridging sleeve and the plumbing member so that a substantially continuous internal conduit surface can be achieved, without steps or kinks where solid elements, such as hairs or fibres, entrained in the draining stream could be trapped and form a plug.

It is yet another advantage of the previously described connector that it produces a neat and professional finish when inserting a plumbing member into an existing drainage pipeline.

The bridging sleeve may be slidable over the existing pipeline. In at least one embodiment of the present invention when the bridging sleeve is slidable over the existing pipe, the insertion of the plumbing member into the existing pipeline is greatly facilitated, making it less time consuming, because more space is available to insert the plumbing member if the bridging sleeve is slid over onto the pipeline end and then slid back towards the plumbing member to form a sealed connection.

The first and/or second sealing device may comprise a clip.

The first and or second sealing device may comprise a clamp. In at least one embodiment of the present invention a clamp can be used to apply a force to the external surface of the first tubular section of the bridging sleeve and/or to the external surface of the plumbing member so that they form a seal between the bridging sleeve first tubular section and an external surface of the existing pipeline and/or between the plumbing member internal surface and the external surface of the bridging sleeve second tubular section, respectively, by compression of the first and/or second sealing elements, respectively.

The first and/or second sealing device may comprise a collar.

The first and/or second sealing device may comprise a profiled section. The profiled section may comprise a serrated profile. Alternatively or additionally the profiled section may comprise a threaded profile. Alternatively or additionally the profiled section may comprise a ball or socket profile.

The first and/or second sealing device may comprise a threaded collar.

The bridging sleeve may comprise a connecting portion.

The first sealing device may be engageable to the bridging sleeve connecting portion.

The second sealing device may be engageable to a plumbing member connecting portion.

The bridging sleeve connecting portion may comprise a profiled section.

The profiled section of the bridging sleeve connecting portion may comprise a tapered section opposite to the profiled section.

The profiled section of the bridging sleeve connecting portion may comprise a threaded section. Alternatively or additionally the profiled section of the bridging sleeve connecting portion may comprise a serrated portion. Alternatively or additionally the profiled section of the bridging sleeve connecting portion may comprise a ball or a socket profile.

In at least one embodiment of the present invention a profiled first or second sealing device facilitates the formation of a seal between the first tubular section of the bridging sleeve and the external surface of an existing pipeline or between the bridging sleeve second tubular section and an internal surface of the plumbing member, respectively, by engaging the profile of the first and/or second sealing device with a matching profile of the connecting portion of the bridging sleeve and/or with a matching profile of the plumbing member, respectively, and reversibly or irreversibly retaining them in a position that causes compression of the first and/or second sealing elements, respectively.

The/each sealing element may form part of the bridging sleeve. In at least one embodiment of the present invention when the/each sealing element forms part of the bridging sleeve, there is less risk of losing the sealing elements when installing the connector in place. Additionally, if the/each sealing element forms part of the bridging sleeve it is easier to install the connector in a gap created in an existing pipeline because the relative position between the/each sealing element and the bridging sleeve is fixed.

Alternatively the/each sealing element may be separate from the bridging sleeve.

The/each sealing element may comprise a compression ring.

The/each sealing element may comprise a tapered section.

The/each sealing element may comprise a plastic material. In at least one embodiment of the present invention a sealing element comprising a plastic material allows that a more hermetic sealing engagement between the bridging sleeves and the pipe and between the bridging sleeves and the plumbing member can be obtained. A suitable plastic material is for example graphite, which is plastic and can for hermetic seals.

The/each sealing element may comprise an elastic material. In at least one embodiment of the present invention, a sealing element comprising an elastic material allows that an even a more hermetic sealing engagement between the bridging sleeves and the pipe and between the bridging sleeves and the plumbing member can be obtained, compared with a plastic sealing element. A suitable elastic material is for example rubber, which is elastic and can form hermetic seals.

According to a second aspect of the present invention there is provided a kit of parts for sealingly inserting a plumbing member into a gap created in an existing pipeline, the kit of parts comprising:

a plumbing member,
a pair of bridging sleeves,
a pair of first sealing devices,
a pair of second sealing devices,
a pair of first sealing elements, and
a pair of second sealing elements wherein, in use, the first sealing devices are adapted to form first seals between one bridging sleeve first tubular section internal surface and an existing pipeline external surface and the second sealing devices are adapted to form second seals between a/the plumbing member internal surface and a bridging sleeve second tubular section external surfaces.

The plumbing member may comprise a first end and a second end.

The plumbing member first and/or second end may comprise a profiled section.

The profiled section of the plumbing member first and/or second end may comprise a tapered section.

The plumbing member first and/or second end may comprise a threaded section.

The plumbing member may comprise at least one functional feature. In at least one embodiment of the present invention if the plumbing member comprises at least one functional, then the at least one functional feature is added to the existing pipeline.

The at least one functional feature may comprise a filter, an anti-rodent barrier, a fluid inlet, a fluid outlet, a pressure relief device, etc.

The kit of parts may be removable after installation. In at least one embodiment of the present invention a removable kit of parts can be easily removed after installation, for example, for cleaning or maintenance of the plumbing member.

Embodiments of the second aspect of the invention may comprise features or embodiments of the first aspect of the invention and vice versa and are not repeated for brevity.

BRIEF DESCRIPTION OF THE DRAWINGS

Now, by way of example only, embodiments of the present invention will be described with reference to the following drawings, in which.

DETAILED DESCRIPTION OF THE DRAWINGS

Figure 1:
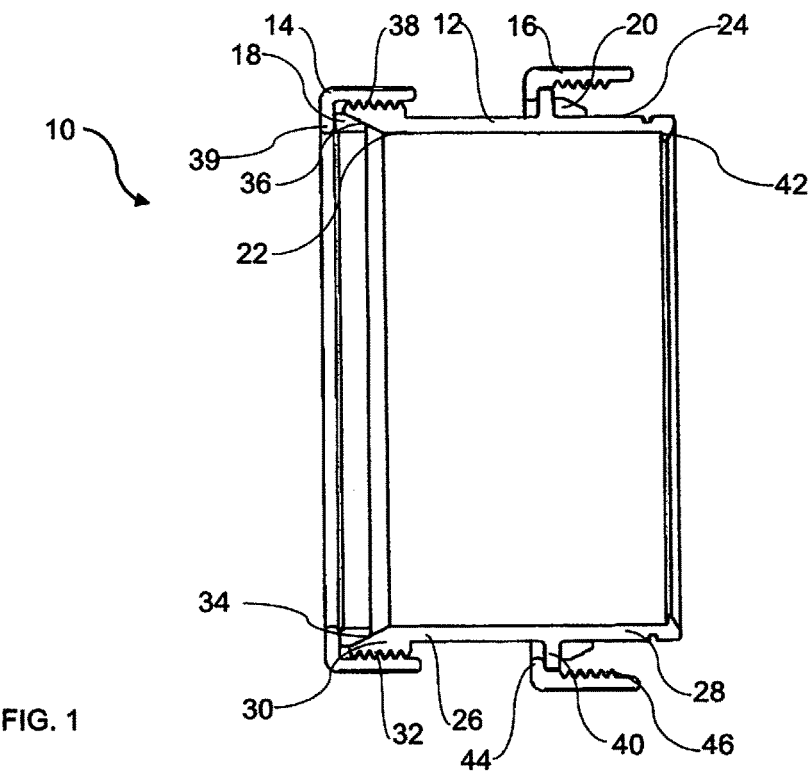
FIG. 1 shows an embodiment of the present invention comprising a bridging sleeve with same first and second tubular section diameters.

Referring to FIG. 1 an embodiment of the present invention will be described. FIG. 1 shows a connector, generally indicated by reference numeral 10, for sealingly inserting a plumbing member (not shown) into a gap created in an existing pipeline (not shown). The connector 10 comprises a bridging sleeve 12, a first sealing device 14, a second sealing device 16, a first sealing element 18 and a second sealing element 20.

In use, the first sealing device 14 is adapted to form a first seal between a bridging sleeve first tubular section internal surface 22 and an existing pipeline external surface (not shown) by compression of the first sealing element 18 and the second sealing device 16 is adapted to form a second seal between a plumbing member internal surface (not shown) and a bridging sleeve second tubular section external surface 24 by compression of the second sealing element 20.

In this embodiment, the bridging sleeve 12 comprises a first tubular section 26 and a second tubular section 28 which have the same internal diameter.

The first tubular section 26 comprises a connecting portion 30. The connecting portion comprises an external threaded profile 32 and an internal tapered profile 34. The first sealing element 18 comprises a matching tapered profile 36 which, in use, engages with the internal tapered profile 34.

The first sealing device 14 comprises an internal threaded profile 38 which, in use, engages with the external threaded profile 32 of the bridging sleeve connecting portion 30.

The first sealing element 18, in use, is compressed by bringing the first sealing device 14 into tight engagement with the bridging sleeve 12, through their respective profiled ends, and forms a seal between the first tubular section internal surface 22 of the bridging sleeve and the external surface of a pipeline (not shown).

The first sealing device 14 also comprises a sealing rim 39 which, in use, pushes and compresses the first sealing element 18 into engagement with the internal tapered profile 34 of the bridging sleeve 12.

The second tubular section 28 comprises an external rim 40 and an internal rim 42. The second sealing device 16 also comprises a rim 44. In use, the external rim 42 of the second tubular section 28 engages the rim 44 of the second sealing device, as seen in FIG. 1. This causes that when, in use, the second sealing device threaded profile 46 engages a threaded profile of a plumbing member (not shown) it creates movement of the plumbing member towards the external rim 40 until the plumbing member engages and compresses the second sealing element 20, thus forming a seal between a plumbing member internal surface (not shown) and a bridging sleeve second tubular section external surface 24 by compression of the second sealing element 20.

The internal rim 42 of the second tubular section 28 functions as a stop rim so that the bridging sleeve 12 cannot be slid over a pipeline beyond the internal rim 42.

In this embodiment, the bridging sleeve 12 and the first and second sealing devices 14, 16 are made of ABS plastic and the first and second sealing elements 18, 20 are made of rubber. Their dimensions are not given because they are not critical to illustrate the invention nor to the inventive principle and it will be understood that embodiments with different dimensions form part of the present invention. It will also be understood that for commercial applications standard diameters are preferred.

Figure 2:
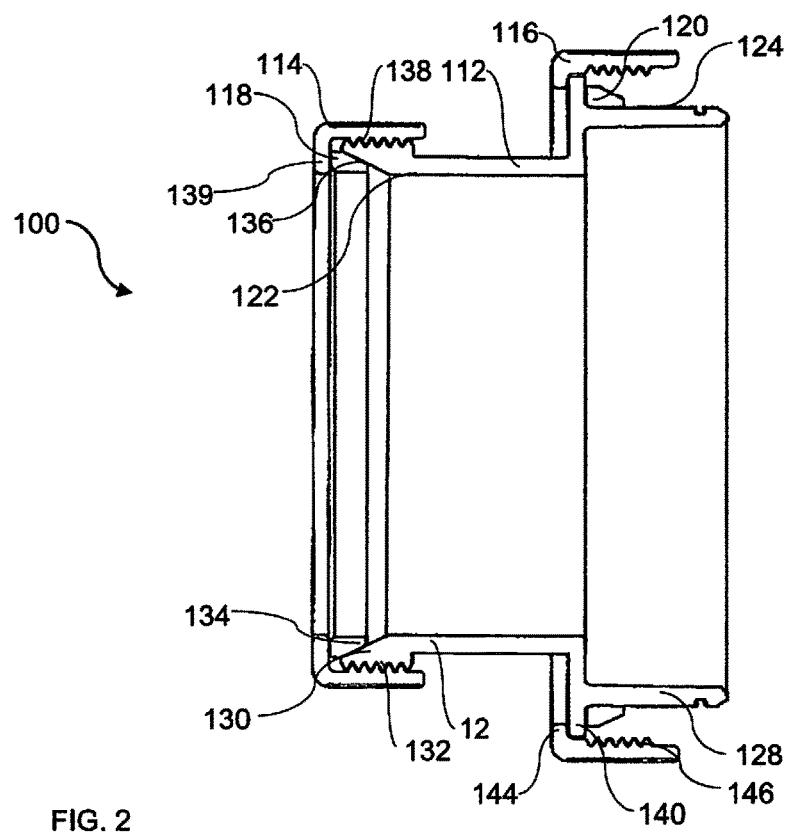
FIG. 2 show another embodiment of the present invention comprising a bridging sleeve with different first and second tubular section diameters.

FIG. 2 shows another embodiment of the invention with a high similarity with the embodiment of FIG. 1. Equivalent features are indicated in FIG. 2 incremented by 100. The main difference between the embodiment of FIG. 2 and the embodiment of FIG. 1 is that in the embodiment of FIG. 2, the first tubular 126 section of the bridging sleeve 112 has a different diameter that the second tubular section 128 of the bridging sleeve 112 and consequently, the first sealing device 114 has a different diameter than the second sealing device 116 and the first sealing element 118 has a different diameter than the second sealing element 120.

The mode of action of embodiments of FIG. 2 is equivalent with that of FIG. 1 and it will not be repeated for brevity.

It will be understood that embodiments with different methods of compressing the sealing elements fall within the scope of the present invention, as mentioned above and that the methods described here do not constitute limiting features of the same.

Figure 3A:
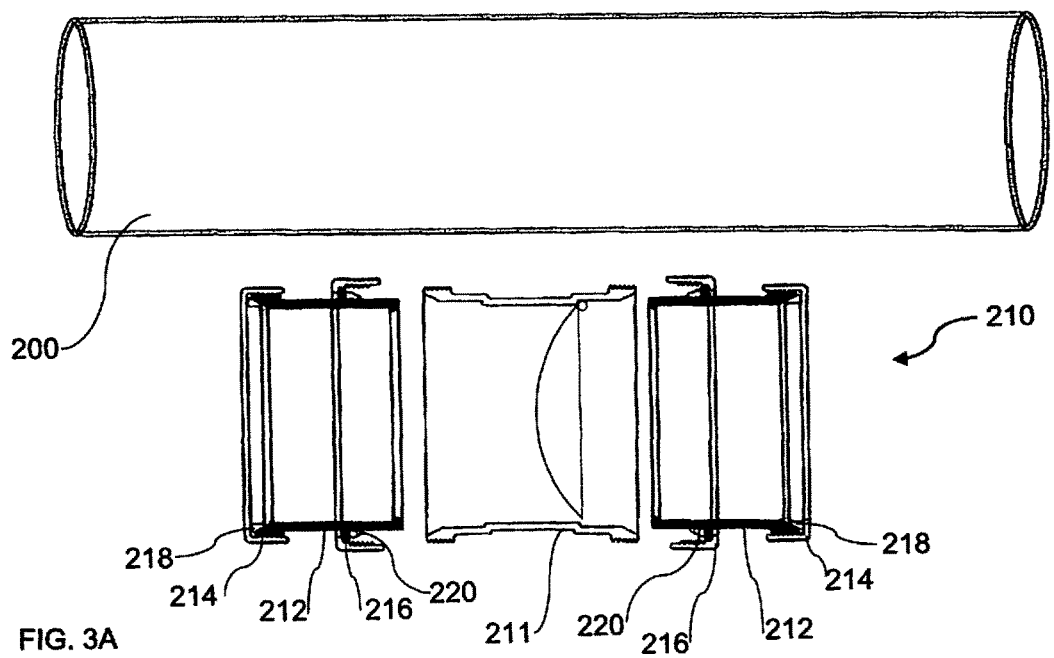
FIGS. 3A, 3B and 3C show how to install an anti-rodent barrier in an existing pipeline using an embodiment of the present invention.
Figure 3B:
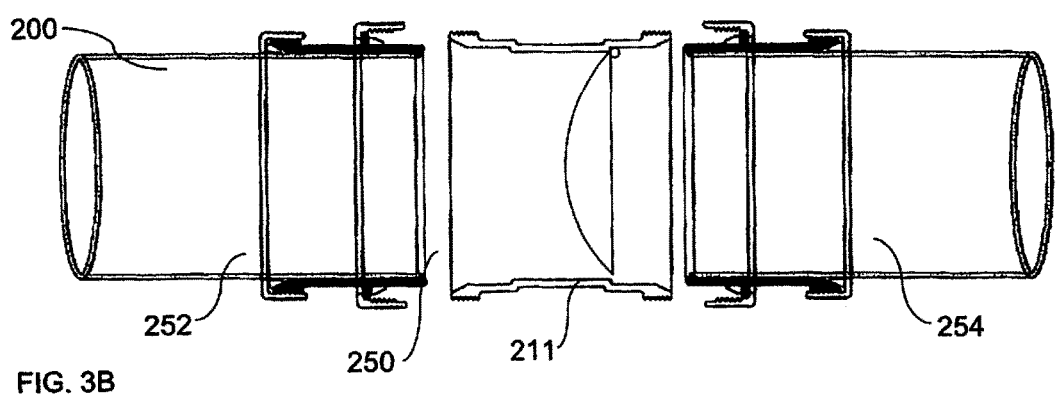
Figure 3C:
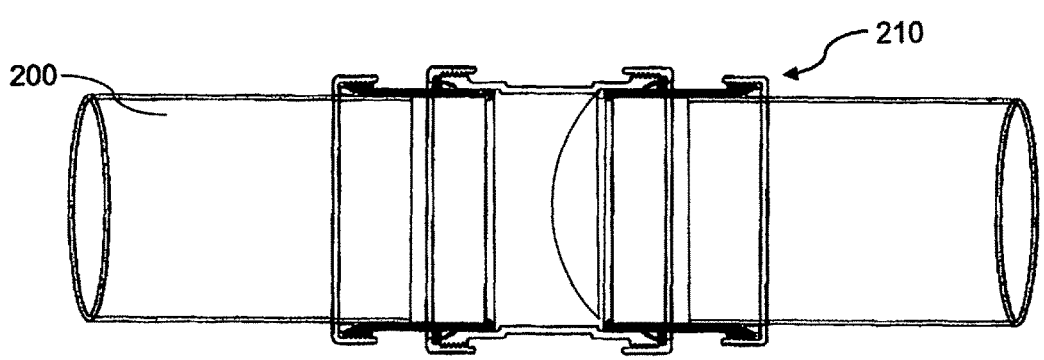

Referring now to FIGS. 3A, 3B and 3C a method of using another embodiment of the present invention will be described.

FIG. 3A shows an existing drainage pipeline 200 in which an anti-rodent barrier is to be inserted. FIG. 3A also shows a kit of parts 210 comprising a plumbing member, which in this case is an anti-rodent barrier fitting 211. The kit of parts also comprises a pair of bridging sleeves 212, a pair of first sealing devices 214, a pair of second sealing devices 216, a pair of first sealing elements 218 and a pair of second sealing elements 220.

Firstly, the existing drainage pipeline 200 is severed, removing a portion of pipe of appropriate length and leaving a gap 250 long enough for installing the anti-rodent barrier fitting 211 and the bridging sleeves 212 with the other elements of the kit of parts 210, as will be described in the following paragraph (See FIG. 3B).

Secondly, a first sealing device 214, a first sealing element 218 and a bridging sleeve 212 with a second sealing device 216 and second sealing element 220 on it are slid over each end 252, 254 of the existing drainage pipeline, so that the gap 250 is still long enough to insert the anti-rodent barrier fitting 211.

After placing the anti-rodent fitting 211 in-line with the existing pipeline 200, the bridging sleeves 212 are slid back towards the anti-rodent fitting 211 and each of the second sealing devices 216 is threaded onto each end of the anti-rodent fitting 211, so that each second sealing element 220 forms a seal between each end of the anti-rodent fitting 211 and each bridging sleeve 212.

Finally, each of the first sealing devices 214 is brought into engagement with each bridging sleeve 212 and threaded tightly onto them, so that each first sealing element 218 forms a seal between each end of the existing pipeline 252, 254 and each bridging sleeve 212 respectively.

In this way, a plumbing element, such as anti-rodent barrier 211 in this case, can be sealingly inserted into an existing pipeline, rapidly, easily, at low cost and with a neat and professional finish.

It is to be understood that the present invention not only encompasses sealing devices with threaded ends, but also serrated or toothed ends, or ball and socket connections can also be implemented without departing from the principles of the invention. Similarly, clamping sealing devices are also conceivable within the scope of the present invention, in which the sealing devices clamp around the bridging sleeves or plumbing members and deform them slightly so that they compress the sealing elements to form hermetic seals.

The invention claimed is:

1. A connector operable to sealingly connect a plumbing member to an existing pipeline, wherein the plumbing member is inserted into a gap created in an existing pipeline and between two connectors to secure the plumbing member in the existing pipeline, wherein each connector comprises:
   a bridging sleeve, comprising a first tubular section comprising on one end an internal taper profile and a second tubular section comprising an external rim;
   a first sealing device, engageable with a first surface of the external rim of the second tubular section;
   a second sealing device engageable with a first surface of the external rim of the second tubular section;
   a first sealing element received between the internal taper profiled end of the first tubular section and the first sealing device; and
   a second sealing element received against a second surface of the external rim of the second tubular section,
   wherein the bridging sleeve comprises a connecting portion operable to engage with the first sealing device and the first sealing element to form a seal between the bridging sleeve and the existing pipeline,
   wherein, in use, a portion of the existing pipeline is received within the first tubular section and the first sealing device is engageable with the external surface of the first tubular section, wherein engagement of the first sealing device with the external surface of the first tubular section is operable to create a first seal between an internal surface of the first tubular section and an external surface of the existing pipeline by compression of the first sealing element between the internal taper profiled end of the first tubular section and the first sealing device, and wherein the second sealing device is operable to form a second seal between a plumbing member internal surface and an external surface of the second tubular section by compression of the second sealing element against the second surface of the external rim of the second tubular section.

2. A connector as claimed in claim 1, wherein the bridging sleeve is slidable over an existing pipeline.

3. A connector as claimed in claim 1, wherein the first sealing device and/or the second sealing device comprises a clip.

4. A connector as claimed in claim 1, wherein the first sealing device and/or the second sealing device comprises a clamp.

5. A connector as claimed in claim 4, wherein the clamp is operable to apply a force to an external surface of the first tubular section of the bridging sleeve and/or to the external surface of the plumbing member such that a seal is formed between the bridging sleeve first tubular section and an external surface of the existing pipeline and/or between the plumbing member internal surface and the external surface of the bridging sleeve second tubular section, respectively, by compression of the first sealing element and/or second sealing element, respectively.

6. A connector as claimed in claim 1, wherein the first sealing device and/or the second sealing device comprises a collar.

7. A connector as claimed in claim 6, wherein the first sealing device and/or the second sealing device comprises a profiled section.

8. A connector as claimed in claim 7, wherein the profiled section comprises a threaded profile.

9. A connector as claimed in claim 6, wherein the first sealing device and/or the second sealing device comprises a threaded collar.

10. A connector as claimed in claim 1, wherein the second sealing device is engageable to a plumbing member connecting portion.

11. A connector as claimed in claim 10, wherein the bridging sleeve connecting portion comprises an external threaded profile and an internal tapered profile operable to sealingly engage the bridging sleeve to an existing pipeline.

12. A connector as claimed in claim 10, comprising a profiled first or second sealing device to facilitate the formation of a seal between the first tubular section of the bridging sleeve and the external surface of an existing pipeline or between the bridging sleeve second tubular section and an internal surface of the plumbing member, respectively, wherein formation of a seal is by engaging the profile of the first and/or second sealing device with a matching profile of the connecting portion of the bridging sleeve and/or with a matching profile of the plumbing member, respectively, and reversibly or irreversibly retaining them in a position that causes compression of the first and/or second sealing elements, respectively.

13. A connector as claimed in claim 1, wherein the/each sealing element forms part of the bridging sleeve.

14. A connector as claimed in claim 1, wherein the/each sealing element is separate from the bridging sleeve.

15. A connector as claimed in claim 1, wherein the/each sealing element comprises a compression ring.

16. A connector as claimed in claim 1, wherein the/each sealing element comprises a tapered section.

17. A connector as claimed in claim 1, wherein the/each sealing element comprises a plastic material.

18. A connector as claimed in claim 17, wherein the plastic material comprises graphite.

19. A connector as claimed in claim 1, wherein the/each sealing element comprises an elastic material.

20. A connector as claimed in claim 19, wherein the elastic material comprises rubber.

21. A connector operable to sealingly connect a plumbing member to an existing pipeline, wherein the plumbing member is inserted into a gap created in an existing pipeline and between two connectors to secure the plumbing member in the existing pipeline, wherein each connector comprises:

a bridging sleeve, comprising a first tubular section comprising on one end an internal taper profile and a second tubular section comprising an external rim;

a first sealing device, engageable with a first surface of the external rim of the second tubular section;

a second sealing device engageable with a first surface of the external rim of the second tubular section;

a first sealing element received between the internal taper profiled end of the first tubular section and the first sealing device; and a second sealing element received against a second surface of the external rim of the second tubular section, wherein, in use, a portion of the existing pipeline is received within the first tubular section and the first sealing device is engageable with the external surface of the first tubular section, wherein engagement of the first sealing device with the external surface of the first tubular section is operable to create a first seal between an internal surface of the first tubular section and an external surface of the existing pipeline by compression of the first sealing element between the internal taper profiled end of the first tubular section and the first sealing device, and wherein the second sealing device is operable to form a second seal between a plumbing member internal surface and an external surface of the second tubular section by compression of the second sealing element against the second surface of the external rim of the second tubular section, and wherein at least one of:

the first sealing device and/or the second sealing device comprises a clip, the first sealing device and/or the second sealing device comprises a clamp, or the first sealing device and/or the second sealing device comprises a collar.

22. A connector operable to sealingly connect a plumbing member to an existing pipeline, wherein the plumbing member is inserted into a gap created in an existing pipeline and between two connectors to secure the plumbing member in the existing pipeline, wherein each connector comprises:

a bridging sleeve, comprising a first tubular section comprising on one end an internal taper profile and a second tubular section comprising an external rim;

a first sealing device, engageable with a first surface of the external rim of the second tubular section;

a second sealing device engageable with a first surface of the external rim of the second tubular section;

a first sealing element received between the internal taper profiled end of the first tubular section and the first sealing device; and a second sealing element received against a second surface of the external rim of the second tubular section, wherein, in use, a portion of the existing pipeline is received within the first tubular section and the first sealing device is engageable with the external surface of the first tubular section, wherein engagement of the first sealing device with the external surface of the first tubular section is operable to create a first seal between an internal surface of the first tubular section and an external surface of the existing pipeline by compression of the first sealing element between the internal taper profiled end of the first tubular section and the first sealing device, and wherein the second sealing device is operable to form a second seal between a plumbing member internal surface and an external surface of the second tubular section by compression of the second sealing element against the second surface of the external rim of the second tubular section, and wherein at least one of:
- the/each sealing element forms part of the bridging sleeve,
- the/each sealing element is separate from the bridging sleeve,
- the/each sealing element comprises a compression ring, or
- the/each sealing element comprises a tapered section.

* * * * *